US012688362B2

(12) United States Patent
Sawayama

(10) Patent No.: US 12,688,362 B2
(45) Date of Patent: Jul. 21, 2026

(54) TRANSLATION DEVICE

(71) Applicant: NTT DOCOMO, INC., Chiyoda-ku (JP)

(72) Inventor: Atsuki Sawayama, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 339 days.

(21) Appl. No.: 18/252,060

(22) PCT Filed: Nov. 5, 2021

(86) PCT No.: PCT/JP2021/040820
§ 371 (c)(1),
(2) Date: May 8, 2023

(87) PCT Pub. No.: WO2022/118604
PCT Pub. Date: Jun. 9, 2022

(65) Prior Publication Data
US 2023/0401384 A1 Dec. 14, 2023

(30) Foreign Application Priority Data
Dec. 2, 2020 (JP) ................................. 2020-200385

(51) Int. Cl.
*G06F 40/289* (2020.01)
*G06F 40/253* (2020.01)
(Continued)

(52) U.S. Cl.
CPC .......... *G06F 40/289* (2020.01); *G06F 40/253* (2020.01); *G06F 40/47* (2020.01)

(58) Field of Classification Search
CPC ...... G06F 40/30; G06F 40/211; G06F 40/205; G06F 40/284; G06F 40/289; G06F 40/40;
(Continued)

(56) References Cited

U.S. PATENT DOCUMENTS 5,479,563 A * 12/1995 Yamaguchi ............. G10L 15/05
704/232
6,473,729 B1 * 10/2002 Gastaldo ................. G06F 40/45
704/7
(Continued)

FOREIGN PATENT DOCUMENTS

JP 2013-206253 A 10/2013

OTHER PUBLICATIONS

International Preliminary Report on Patentability and Written Opinion issued on Jun. 15, 2023 in PCT/JP2021/040820 (submitting English translation only), 5 pages.
(Continued)

*Primary Examiner* — Richemond Dorvil
(74) *Attorney, Agent, or Firm* — Oblon, McClelland, Maier & Neustadt, L.L.P.

(57) ABSTRACT

A translation device includes: a determination unit that determines a translation range for translating a first chunk to be translated; a translation unit that translates the translation range; and an output unit that outputs a translation result by the translation unit. The determination unit adds, to the translation range, the first chunk and a second chunk that includes a verb corresponding to a word included in the first chunk and that is closer to a beginning of an original sentence than the first chunk when no verb is included in the first chunk.

9 Claims, 13 Drawing Sheets

(51) Int. Cl.
    *G06F 40/47*          (2020.01)
    *G10L 15/08*          (2006.01)
    *G10L 15/26*          (2006.01)

(58) Field of Classification Search
    CPC .... G06F 40/268; G06F 16/3344; G06F 40/58;
                G06F 40/42; G06F 40/279; G06F 40/253;
                              G06F 40/47; G06F 40/44
    USPC ............................................................ 704/2
    See application file for complete search history.

(56)               References Cited

U.S. PATENT DOCUMENTS

| | | | |
|---|---|---|---|
| 11,106,879 B2 * | 8/2021 | Farhan | G06F 40/51 |
| 12,086,559 B2 * | 9/2024 | Sheinin | G06F 40/289 |
| 12,373,655 B2 * | 7/2025 | Zhang | G06F 40/47 |
| 2008/0154577 A1 * | 6/2008 | Kim | G06F 40/45 |
| | | | 704/5 |
| 2015/0081273 A1 * | 3/2015 | Sonoo | G06F 40/44 |
| | | | 704/2 |
| 2016/0093301 A1 * | 3/2016 | Bellegarda | G06F 40/274 |
| | | | 704/9 |
| 2018/0075023 A1 * | 3/2018 | Kim | G06F 40/289 |
| 2019/0095433 A1 * | 3/2019 | Lee | G06F 40/56 |
| 2020/0050672 A1 * | 2/2020 | Jade | G06F 40/30 |
| 2021/0326538 A1 * | 10/2021 | Zhang | G06F 40/44 |
| 2022/0245363 A1 * | 8/2022 | Nakamura | G06F 40/44 |

OTHER PUBLICATIONS

International Search Report mailed on Jan. 25, 2022 in PCT/JP2021/040820 filed on Nov. 5, 2021.

* cited by examiner

Si1 — We met at Marriott

Si2 — We met at Marriott in Nagoya

Si3 — because we had to decide

Si4 — because we had to decide which to choose.

St1 — 私たちはマリオットで会いました

St2 — 私たちは名古屋のマリオットで会いました

St3 — なぜなら私たちは決断しなければならなかったからです

St4 — なぜなら私たちはどちらにするのかを決断しなければならなかったからです。

TRANSLATION DEVICE

TECHNICAL FIELD

The present disclosure relates to a translation device.

BACKGROUND ART

There is known a translation device that divides a sequentially input character string, such as a character string obtained by performing speech recognition on an utterance, into appropriate processing units and translates each divided character string. For example, Patent Literature 1 describes a translation device that divides a recognition result character string obtained by performing speech recognition processing on speech uttered in first language into units for performing translation processing to generate a source language character string, and translates the source language character string into a target language character string in second language.

CITATION LIST

Patent Literature

Patent Literature 1: Japanese Unexamined Patent Publication No. 2013-206253

SUMMARY OF INVENTION

Technical Problem

In the translation device described in Patent Literature 1, it is detected whether or not there is ambiguity in a target language character string, and an additional phrase is added when there is ambiguity. However, since the divided character string is translated without considering the context, the character string may be translated into a meaning different from the meaning in the source language. Therefore, even if an additional phrase is added after translation, the translation accuracy may not be improved.

The present disclosure describes a translation device capable of improving translation accuracy while shortening the time until a translation result is obtained.

Solution to Problem

A translation device according to an aspect of the present disclosure is a device that translates an original sentence in units of chunks which are processing units. The translation device includes: a determination unit that determines a translation range for translating a first chunk to be translated; a translation unit that translates the translation range; and an output unit that outputs a translation result by the translation unit. The determination unit adds, to the translation range, the first chunk and a second chunk that includes a verb corresponding to a word included in the first chunk and that is closer to a beginning of the original sentence than the first chunk when no verb is included in the first chunk.

In the translation device, since the original sentence is translated in units of chunks, it is possible to shorten the time until the translation result is obtained as compared with the case where the entire original sentence is translated. When no verb is included in the first chunk to be translated, a second chunk including a verb corresponding to a word included in the first chunk among chunks closer to the beginning of the original sentence than the first chunk and the first chunk are added to the translation range, and the translation range is translated. According to this configuration, since a verb is included in the translation range, the meaning of each word in the original sentence can be made clearer, and the context can be made clearer. Therefore, it is possible to improve the translation accuracy while shortening the time until the translation result is obtained.

Advantageous Effects of Invention

According to the present disclosure, it is possible to improve translation accuracy while shortening the time until a translation result is obtained.

DESCRIPTION OF EMBODIMENTS

In the following, embodiments of the present disclosure will be described with reference to the drawings. It should be noted that in the description of the drawings, the same components are designated with the same reference signs, and the redundant description is omitted.

Figure 1:
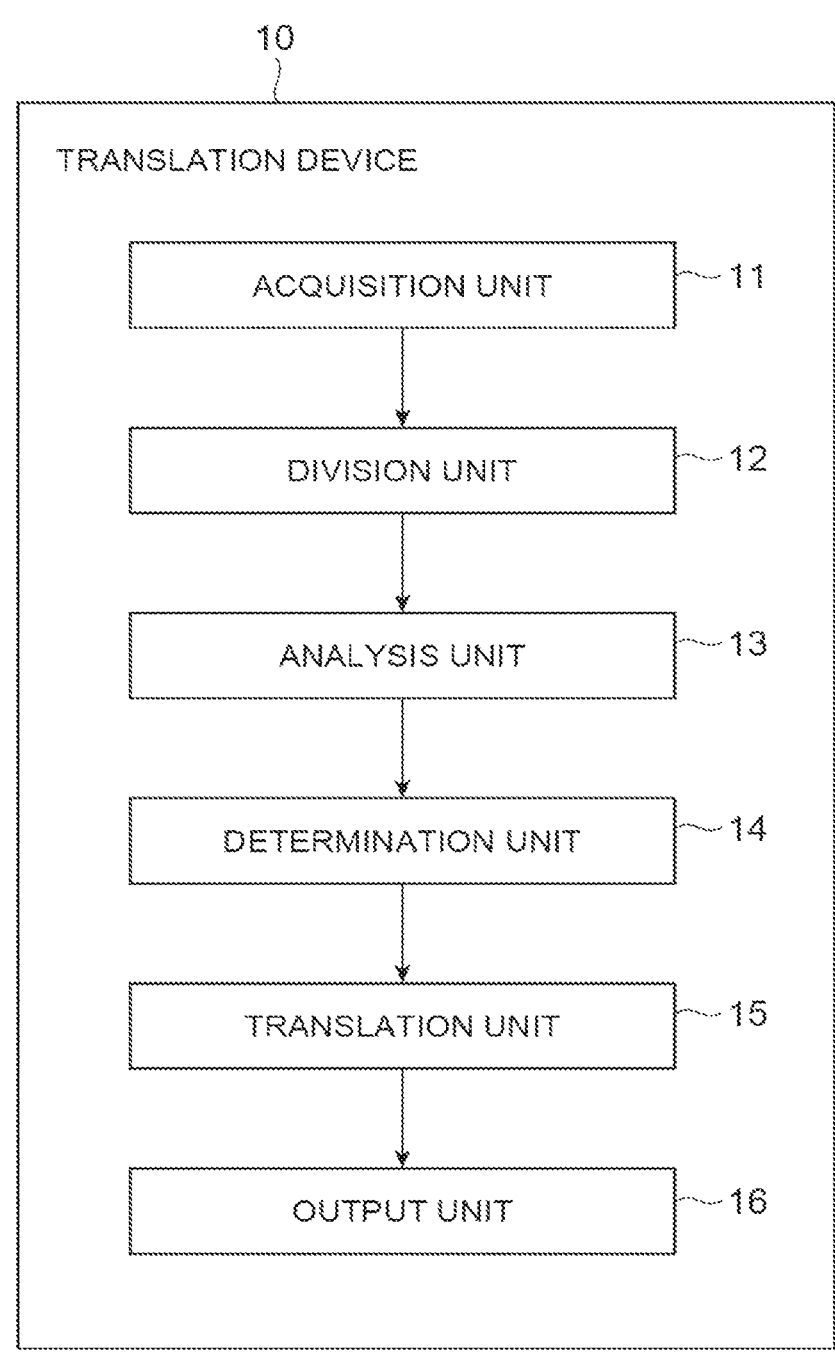
FIG. 1 is a block diagram showing a functional configuration of a translation device according to an embodiment.

A functional configuration of a translation device 10 will be described with reference to FIG. 1. FIG. 1 is a block diagram showing a functional configuration of a translation device according to an embodiment. The translation device 10 shown in FIG. 1 is a device that translates an original sentence in units of chunks. A chunk is a processing unit suitable for translation processing. The translation device 10 translates an original sentence in first language to generate a translated sentence in second language different from first language. The translation device 10 is, for example, a simultaneous translation (real-time translation) device that translates an original sentence obtained by performing speech recognition on an utterance of a user. An example of the translation device 10 is an information processing device such as a server device.

As shown in FIG. 1, the translation device 10 functionally includes an acquisition unit 11, a division unit 12, an analysis unit 13, a determination unit 14, a translation unit 15, and an output unit 16. Since the function (operation) of each functional unit will be described in detail in the description of the translation method described later, the function of each functional unit will be briefly described here.

The acquisition unit 11 is a functional unit that acquires an original sentence. The acquisition unit 11 acquires an original sentence from, for example, a speech recognition device (not shown). The acquisition unit 11 acquires the original sentence in order from the beginning of the original sentence.

The division unit 12 is a functional unit that divides an original sentence into chunks. The division unit 12 extracts specific morphemes (words) from the original sentence by, for example, named entity extraction and rule-based extraction, and divides the original sentence based on the extracted morphemes.

The analysis unit 13 is a functional unit that performs dependency analysis of words included in the original sentence. The analysis unit 13 generates dependency information between words by performing dependency analysis. The dependency analysis is performed using a known method.

The determination unit 14 is a functional unit that determines a translation range for translating a target chunk (first chunk). The target chunk is a chunk to be translated. When no verb is included in the target chunk, the determination unit 14 adds at least the target chunk and a chunk (second chunk) that includes a verb corresponding to a word included in the target chunk and is closer to the beginning of the original sentence than the target chunk to the translation range. When a verb is included in the target chunk, the determination unit 14 adds the target chunk to the translation range. When no subject is included in the translation range, the determination unit 14 further adds, to the translation range, a chunk (third chunk) that includes a subject corresponding to the translation range and is closer to the beginning of the original sentence than the target chunk.

The translation unit 15 is a functional unit that translates the translation range. The translation unit 15 includes a machine translation model 50 that receives chunks included in the translation range as input and outputs a translation result. An example of the machine translation model 50 is an encoder-decoder translation model with an attention mechanism. The machine translation model 50 is generated by performing machine learning using each of a plurality of bilingual data included in a bilingual corpus for simultaneous translation as learning data. Details of the machine translation model 50 will be described later.

The output unit 16 is a functional unit that outputs translation result by the translation unit 15. The output unit 16 outputs the translation result to an output device such as a display and a speaker.

Figure 2:
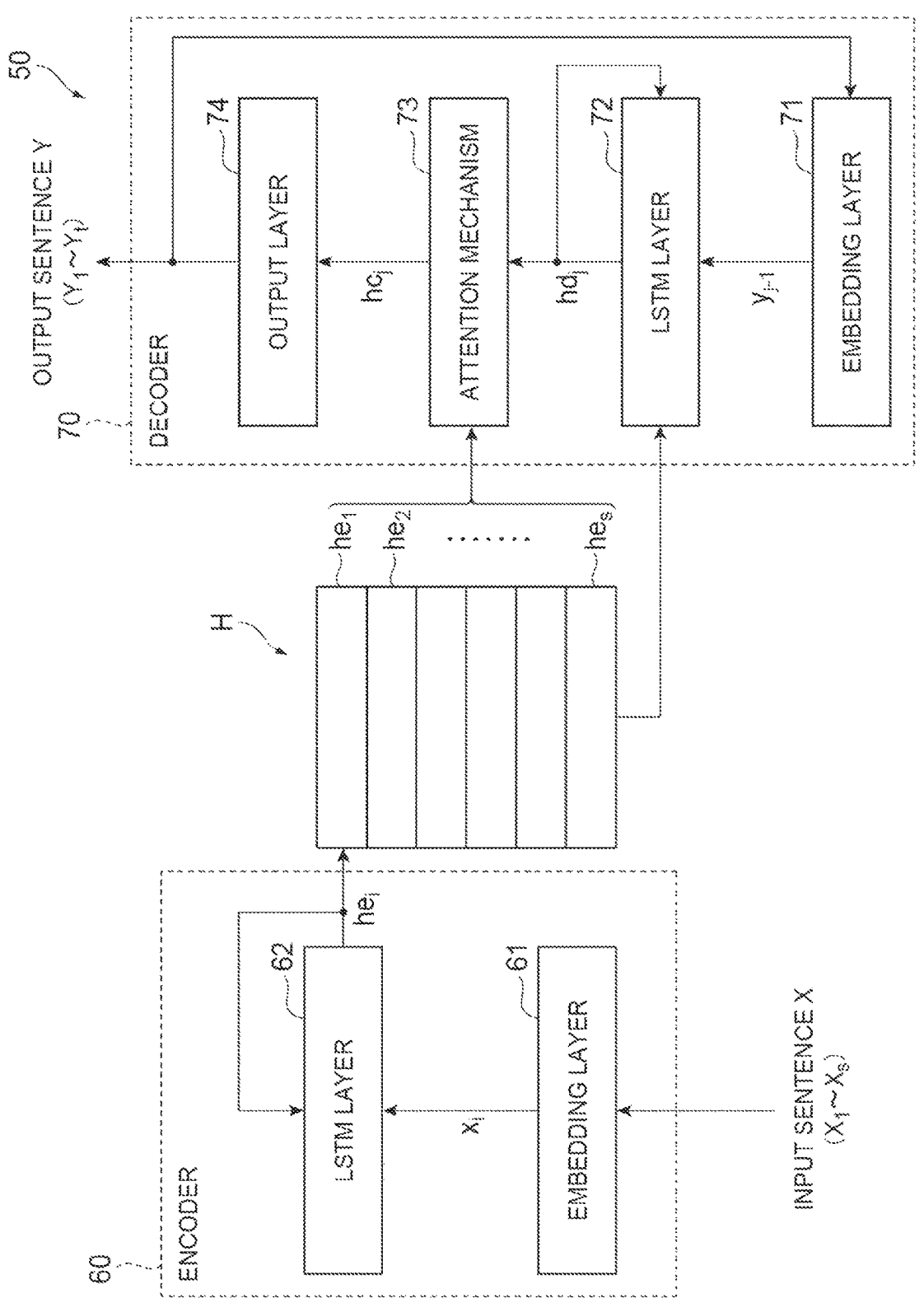
FIG. 2 is a diagram showing a schematic configuration of a machine translation model included in the translation unit shown in FIG. 1.
Figure 3:
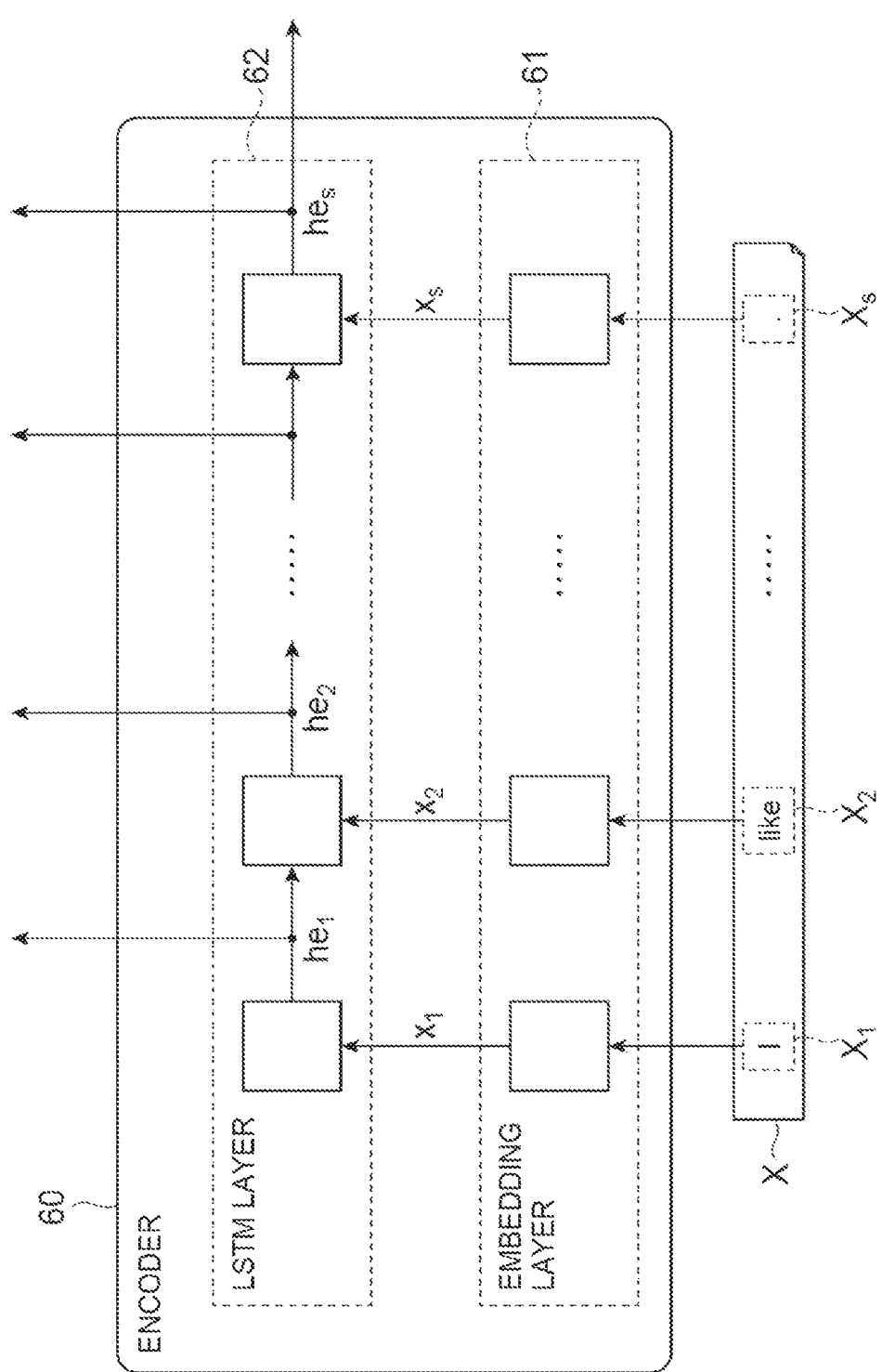
FIG. 3 is a diagram for explaining the processing of the encoder shown in FIG. 2.
Figure 4:
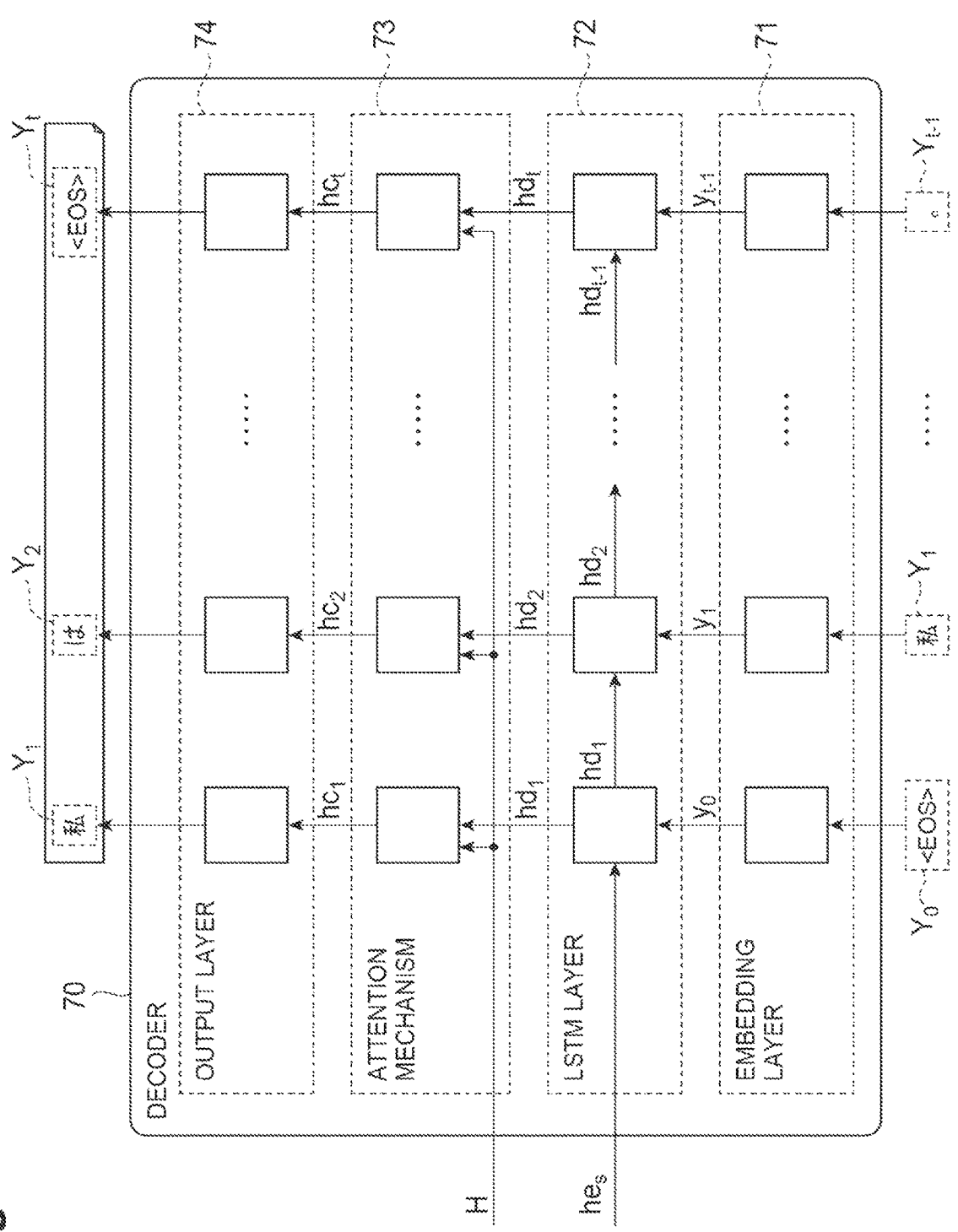
FIG. 4 is a diagram for explaining the processing of the decoder shown in FIG. 2.
Figure 5:
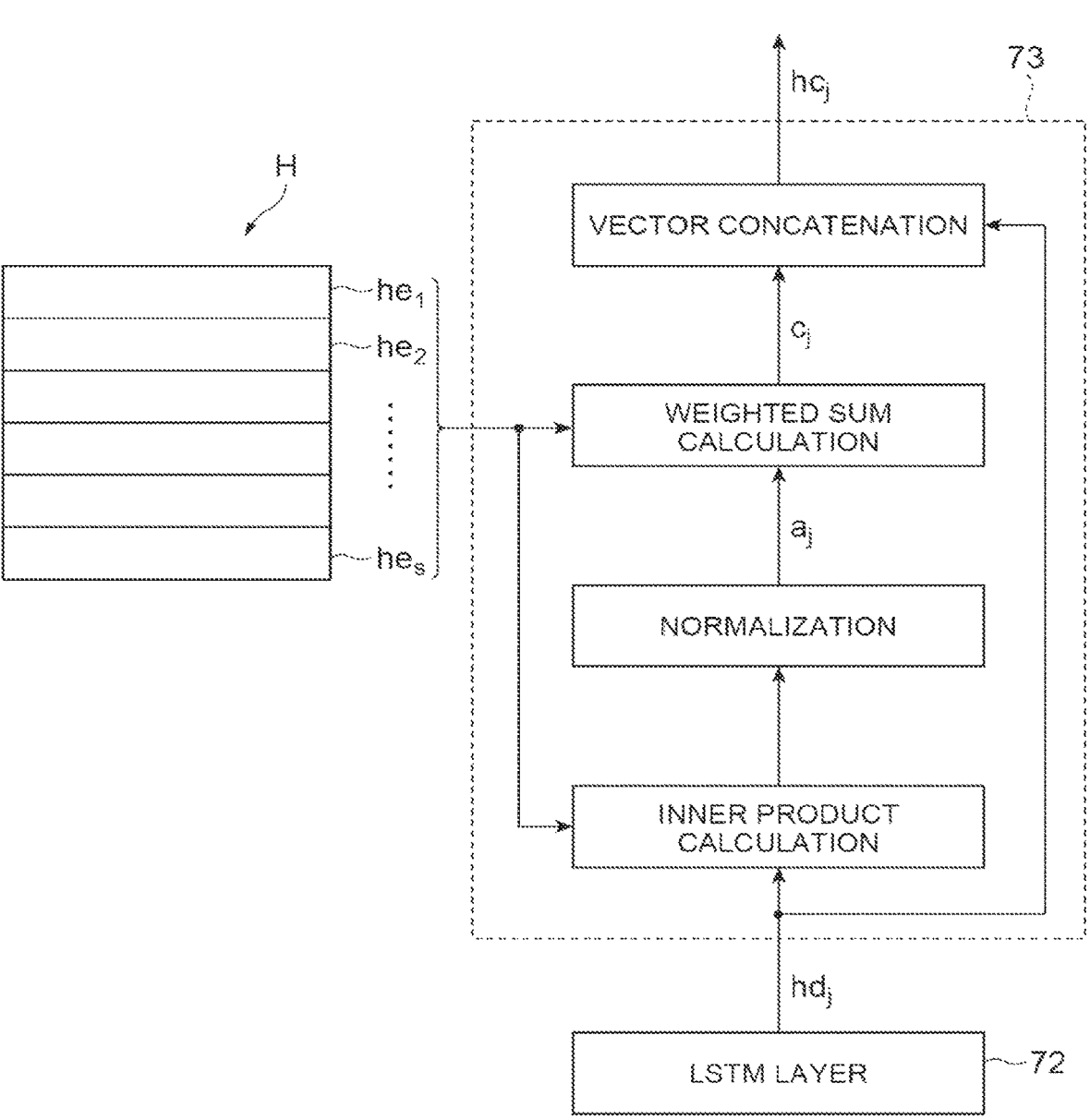
FIG. 5 is a diagram for explaining in detail the processing of the attention mechanism shown in FIG. 2.

Next, a detailed configuration of the machine translation model will be described with reference to FIGS. 2 to 5. FIG. 2 is a diagram showing a schematic configuration of a machine translation model included in the translation unit shown in FIG. 1. FIG. 3 is a diagram for explaining the processing of the encoder shown in FIG. 2. FIG. 4 is a diagram for explaining the processing of the decoder shown in FIG. 2. FIG. 5 is a diagram for explaining in detail the processing of the attention mechanism shown in FIG. 2. As shown in FIG. 2, the machine translation model 50 includes an encoder 60 and a decoder 70.

As shown in FIGS. 2 and 3, the encoder 60 generates a numerically represented hidden state matrix H by encoding an original sentence (input sentence X). Specifically, the encoder 60 generates the hidden state matrix H based on the input sentence X. The input sentence X is a translation range determined by the determination unit 14, and includes s (s is an integer of 1 or more) words (words $X_1$ to $X_s$). In the example shown in FIG. 3, an input sentence in English is used as the input sentence X. The hidden state matrix H is a set of hidden state vectors $he_1$ to $he_s$. When the word $X_1$ is input to the encoder 60, the hidden state vector $he_1$ is output from the encoder 60, and when the word $X_2$ is input to the encoder 60, the hidden state vector $he_2$ is output from the encoder 60. The relationship between another word and another hidden state vector is similar. The encoder 60 is constituted by a neural network. The encoder 60 includes an embedding layer 61 and a long short-term memory (LSTM) layer 62.

The embedding layer 61 is a layer that vectorizes words included in the input sentence X. The embedding layer 61 receives words (words $X_1$ to $X_s$) included in the input sentence X one by one and vectorizes the received words to generate sequentially word vectors $x_1$ to $x_s$. The embedding layer 61 outputs each word vector to the LSTM layer 62.

The LSTM layer 62 is a recursive computation layer and updates the internal state (hidden state) using the word vector received from the embedding layer 61. The LSTM layer 62 receives the word vectors (word vectors $x_1$ to $x_s$) one by one from the embedding layer 61. The LSTM layer 62 generates the hidden state vector $he_i$ by updating the internal state using the received word vector $x_i$ (i is an integer of 1 to s) and the previous hidden state vector $he_{i-1}$. By repeating this processing, the LSTM layer 62 sequentially generates the hidden state vectors $he_1$ to $he_s$. The LSTM layer 62 outputs each hidden state vector to the LSTM layer 62 and the decoder 70.

As shown in FIGS. 2, 4, and 5, the decoder 70 generates a translated sentence (output sentence Y) by decoding the hidden state matrix H generated by the encoder 60. Specifically, the decoder 70 generates the output sentence Y based on the hidden state matrix H. The output sentence Y is a translated sentence that is a translation result of the input sentence X and includes t (t is an integer of 1 or more) words (words $Y_1$ to $Y_t$). Note that the word $Y_t$ is <EOS> which is a special token indicating the end of a sentence. In the example shown in FIG. 4, an output sentence in Japanese is used as the output sentence Y. The decoder 70 is constituted by a neural network. The decoder 70 includes an embedding layer 71, an LSTM layer 72, an attention mechanism (attention layer) 73, and an output layer 74.

The embedding layer 71 is a layer that vectorizes words included in the output sentence Y. The embedding layer 71 receives <EOS> as the word $Y_0$, then receives the words (words $Y_1$ to $Y_{t-1}$) included in the output sentence Y one by one, and vectorizes the received words. The special token <EOS> indicates the beginning of the output sentence Y and the end of the input sentence X. By this processing, the embedding layer 71 sequentially generates word vectors $y_0$ to $y_{t-1}$. The embedding layer 71 outputs each word vector to the LSTM layer 72.

The LSTM layer 72 is a recursive computation layer and updates the internal state (hidden state) using the word vector received from the embedding layer 71. The LSTM layer 72 receives the word vectors (word vectors $y_0$ to $y_{t-1}$) one by one from the embedding layer 71. The LSTM layer 72 generates the hidden state vector $hd_j$ by updating the internal state using the received word vector $y_{j-1}$ (j is an integer of 1 to t) and the previous hidden state vector $hd_{j-1}$. By repeating this processing, the LSTM layer 72 sequentially generates the hidden state vectors $hd_1$ to $hd_t$. The LSTM layer 72 uses the hidden state vector $he_s$ received from the encoder 60 as the hidden state vector $hd_0$ (initial value of the hidden state vector). The LSTM layer 72 outputs each hidden state vector to the LSTM layer 72 and the attention mechanism 73.

The attention mechanism 73 is a mechanism (layer) for using each hidden state vector included in the hidden state matrix H. The attention mechanism 73 calculates attention values $a_i$ for the s hidden state vectors $he_i$. The attention value $a_i$ is a value indicating the degree of similarity between the hidden state vector $he_i$ and the hidden state vector $hd_j$ to each other. The larger the attention value $a_i$ is, the more similar the hidden state vector $he_i$ and the hidden state vector $hd_j$ are. For example, each attention value $a_i$ is a value of 0 to 1, and the sum of the attention values $a_1$ to $a_s$ is 1.

Specifically, as shown in Equation (1), the attention mechanism 73 calculates an inner product of the hidden state vector $hd_j$ received from the LSTM layer 72 and each hidden state vector $he_i$ included in the hidden state matrix H, and normalizes the calculation result so that the calculation result falls within a range of 0 to 1. By this processing, the attention value $a_i$ of each hidden state vector $he_i$ is obtained. The function exp represents an exponential function.

[Equation 1]

$$a_i = \frac{\exp(he_i \cdot hd_j)}{\sum_{i=1}^{s} \exp(he_i \cdot hd_j)} \quad (1)$$

The attention mechanism 73 calculates a context vector $c_j$ by calculating a weighted sum of the hidden state vectors $he_1$ to $he_s$. Specifically, as shown in Equation (2), the attention mechanism 73 calculates the product of the attention value $a_i$ and the hidden state vector $he_i$, and calculates the sum of the calculation results. By this processing, the context vector $c_j$ is obtained.

[Equation 2]

$$c_j = \sum_{i=1}^{s} a_i \times he_i \quad (2)$$

The attention mechanism 73 generates a concatenated vector $hc_j$ by concatenating the context vector $c_j$ and the hidden state vector $hd_j$.

The output layer 74 generates a word $Y_j$ of the output sentence Y from the concatenated vector $hc_j$. For example, the output layer 74 linearly transforms the concatenated vector $hc_j$ and further applies the Softmax function to the computation result to calculate a translation score. The output layer 74 determines the word $Y_j$ based on the translation score. The output layer 74 outputs the word $Y_j$ to the embedding layer 71 and the output unit 16.

Figure 6:
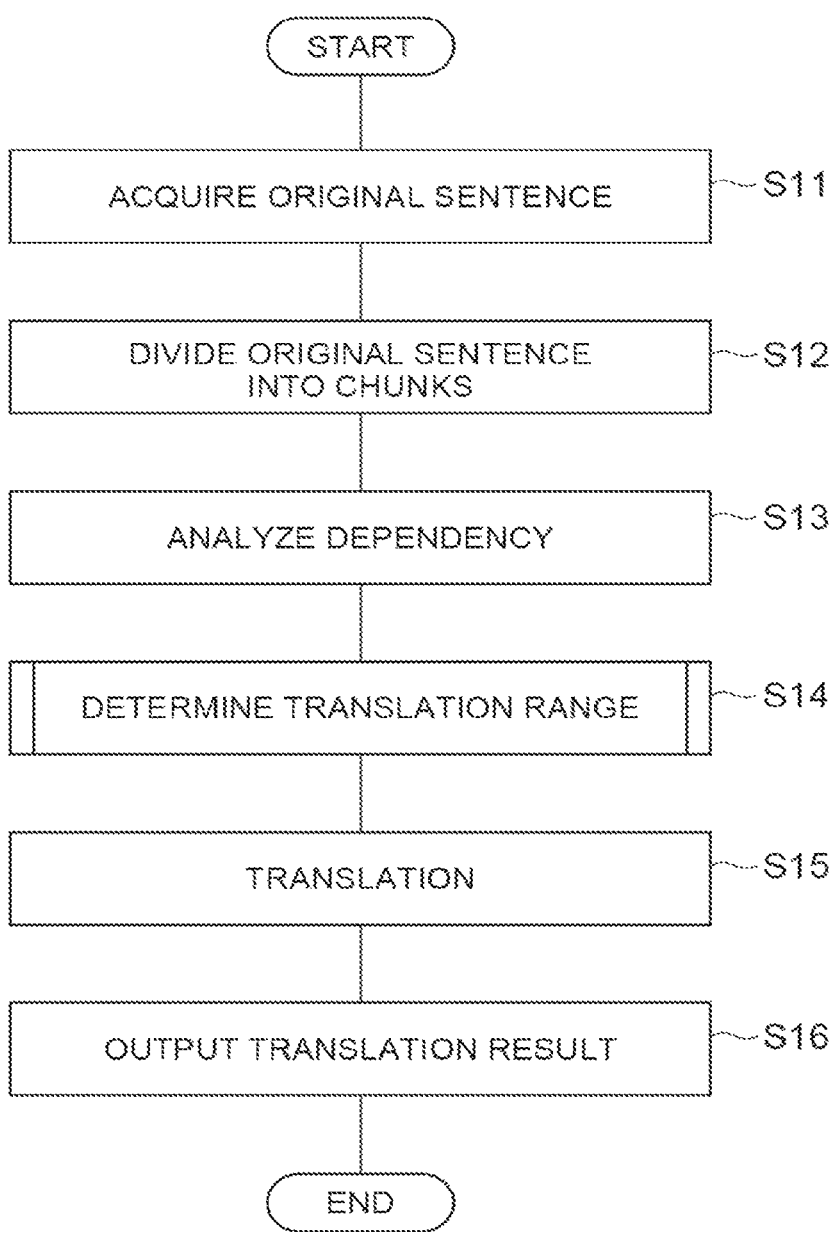
FIG. 6 is a flowchart showing a series of processes of a translation method performed by the translation device shown in FIG. 1.
Figure 7:
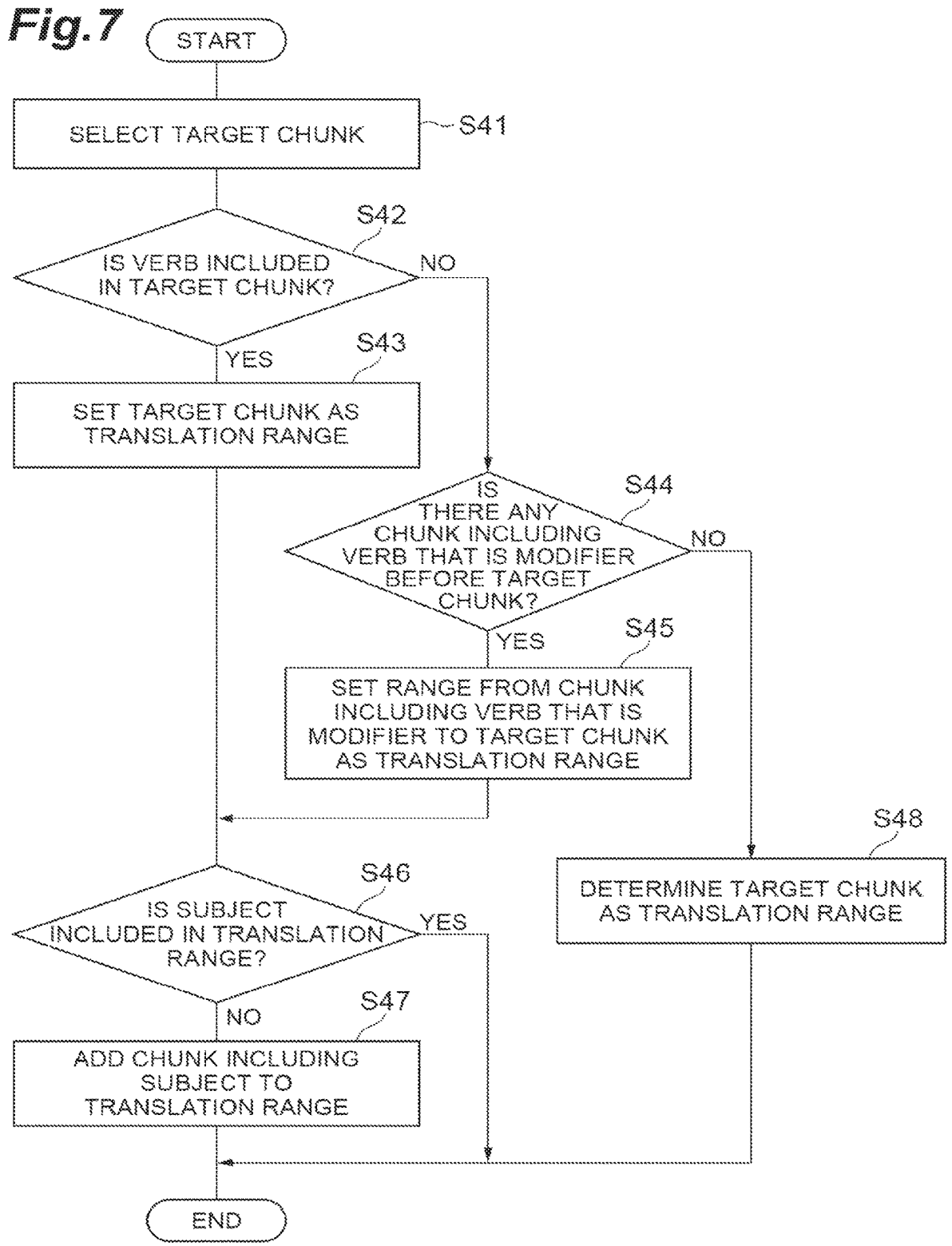
FIG. 7 is a flowchart showing in detail the translation range determination process shown in FIG. 6.
Figure 8:
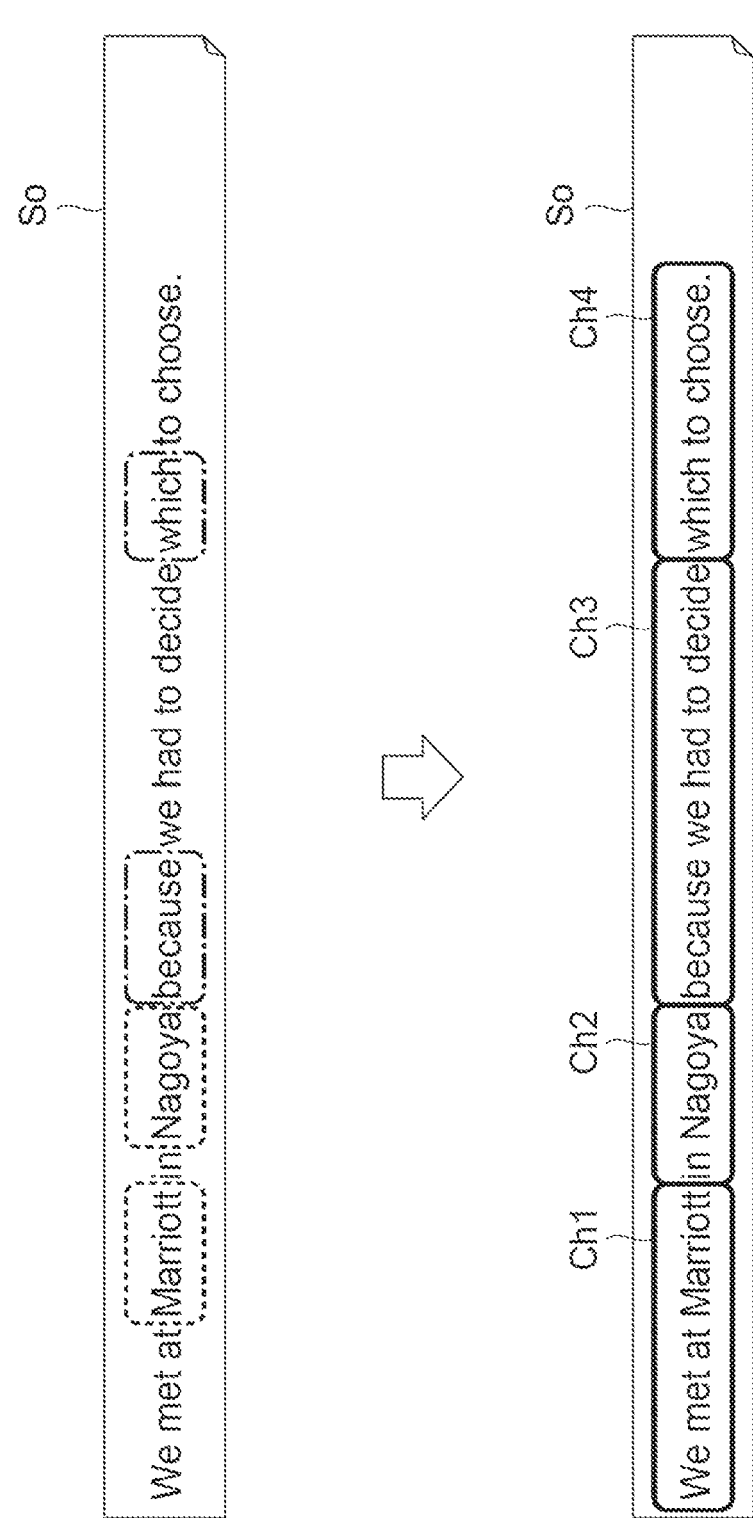
FIG. 8 is a diagram showing an example of chunk division.
Figure 9:
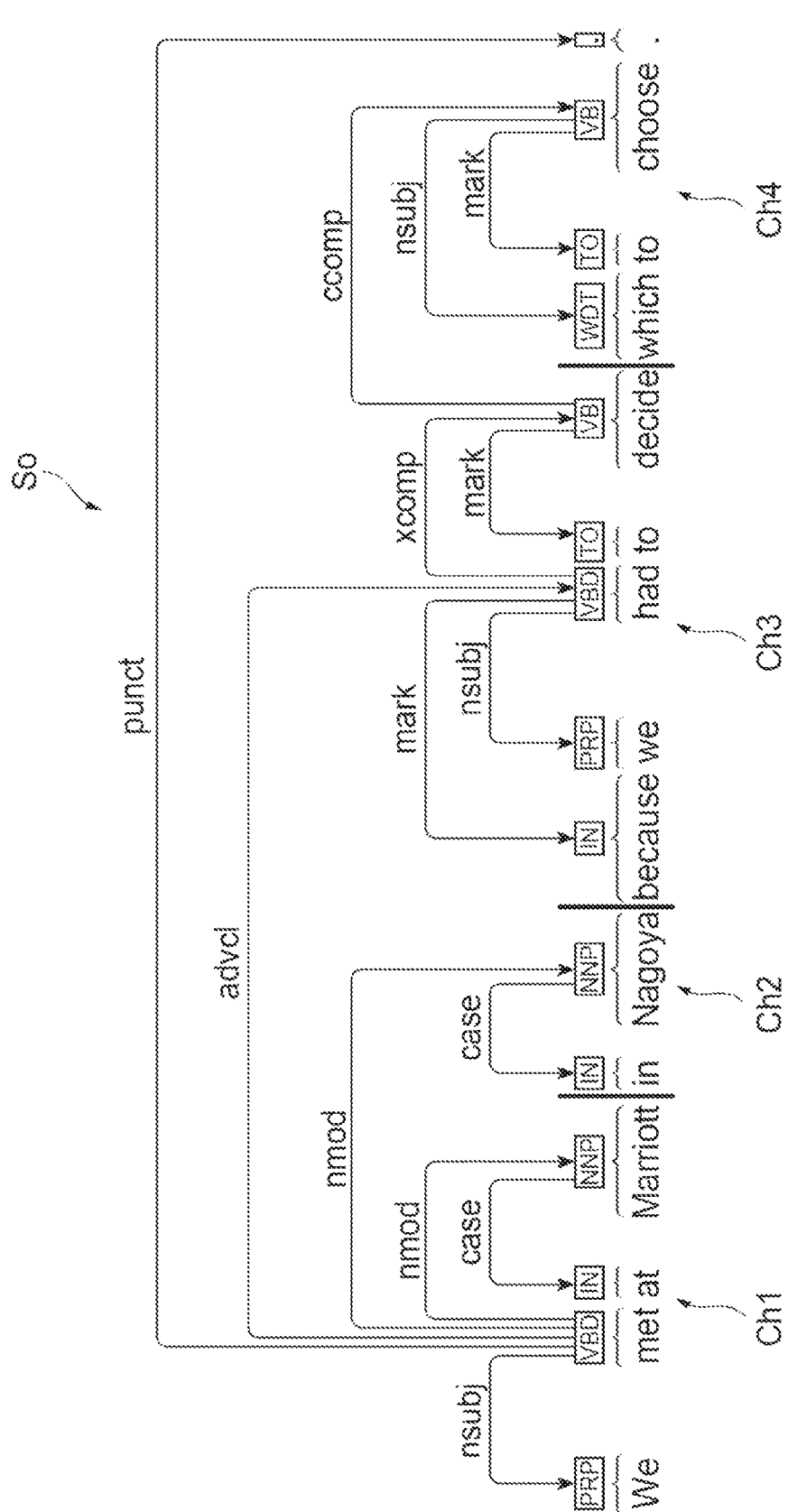
FIG. 9 is a diagram showing an example of dependency analysis.
Figure 10:
FIG. 10 is a diagram showing an example of a translation result.

Next, a translation method performed by the translation device 10 will be described with reference to FIGS. 6 to 10. FIG. 6 is a flowchart showing a series of processes of a translation method performed by the translation device shown in FIG. 1. FIG. 7 is a flowchart showing in detail the translation range determination process shown in FIG. 6. FIG. 8 is a diagram showing an example of chunk division. FIG. 9 is a diagram showing an example of dependency analysis. FIG. 10 is a diagram showing an example of a translation result. The series of processes shown in FIG. 6 is started, for example, in response to the user uttering using a microphone.

As shown in FIG. 6, first, the acquisition unit 11 acquires an original sentence (step S11). In step S11, the acquisition unit 11 acquires the original sentence in order from the beginning of the original sentence. Then, the acquisition unit 11 sequentially outputs the acquired original sentence to the division unit 12.

Subsequently, the division unit 12 divides the original sentence into chunks (step S12). In step S12, upon sequentially receiving the original sentence from the acquisition unit 11, the division unit 12 divides the original sentence into morphemes (words) by performing morphological analysis of the original sentence using a known method. The division unit 12 generates part-of-speech information indicating the part of speech of each word by morphological analysis. The part-of-speech information includes a part-of-speech tag. Examples of part-of-speech tags include "PRP", "VBD", "IN", "NNP", "WDT", and "VB". "PRP" indicates a personal pronoun. "VBD" indicates the past form of the verb. "IN" indicates a preposition or a subordinate conjunction. "NNP" indicates the singular form of a proper noun. "WDT" indicates a WH determiner. "VB" indicates the original form of the verb. Then, the division unit 12 divides the original sentence into chunks by a known method. The division unit 12 extracts specific morphemes (words) from the original sentence by, for example, named entity extraction and rule-based extraction, and divides the original sentence based on the extracted morphemes.

A machine learning model (named entity extraction model) is used for named entity extraction. For the named entity extraction model, LSTM, conditional random fields (CRF), and bidirectional encoder representations from transformers (BERT) may be used. Examples of the named entity class used for named entity extraction include an English named entity class defined by Message Understanding Conference (MUC), a Japanese named entity class defined by Information Retrieve and Extraction Exercise (IREX), an extended named entity class, and a unique named entity class. In accordance with the rule, for example, a conjunction is extracted, but other parts of speech such as a preposition may be extracted. The division unit 12 may divide the original sentence into chunks by a method using machine learning. In this case, sequence labeling such as BERT and recurrent neural network (RNN) may be used.

In the example shown in FIG. 8, the division unit 12 extracts proper nouns "Marriott" and "Nagoya", a conjunction "because", and a WH determiner "which" from the original sentence So. Then, the division unit 12 divides the original sentence So in accordance with a predetermined rule to generate chunks. In this example, the division unit 12 divides the original sentence So immediately after the proper noun and immediately before the conjunction and the WH determiner. As a result, the original sentence So is divided into chunks Ch1 to Ch4.

The division unit 12 divides the original sentence into chunks by, for example, inserting a delimiter tag into the original sentence. The delimiter tag is a special token indicating a division point. The division point is a position at which the original sentence is divided. Then, the division unit 12 outputs the original sentence including the delimiter tags to the analysis unit 13 together with the part-of-speech information in order from the beginning of the original sentence.

Subsequently, the analysis unit 13 analyzes the dependency of the original sentence (step S13). In step S13, upon receiving the original sentence including the delimiter tag and the part-of-speech information from the division unit 12, the analysis unit 13 performs dependency analysis of the original sentence using a known method to generate dependency information between words. As shown in FIG. 9, the dependency information includes a combination of a modifier word and a modified word, and a dependency tag indicating the meaning of dependency. Examples of dependency tags include "nsubj", "case", "nmod", "advcl", "punct", "mark", "xcomp", and "ccomp". The "nsubj" indicates a subject. The "case" indicates a relationship with a particle. The "nmod" indicates a dependency relationship by nouns. The "advcl" indicates an adverb clause. The "punct" indicates punctuation. The "mark" indicates a relative. The "xcomp" indicates a phrase serving as a complement. The "ccomp" indicates a clause serving as a complement.

In the example shown in FIG. 9, the dependency information is schematically represented. The delimiter tag is represented by a line that delimits a division point of the original sentence So. There is a dependency relationship between two words connected by an arrow. The word located at the root of the arrow is the modifier word, and the word located at the tip of the arrow is the modified word. The dependency tag is represented as a character string above the arrow. Then, the analysis unit 13 outputs the dependency information together with the original sentence including the delimiter tags and the part-of-speech information to the determination unit 14 in order from the beginning of the original sentence.

Subsequently, the determination unit 14 performs a determination process of a translation range (step S14). In step S14, as shown in FIG. 7, upon receiving the original sentence including the delimiter tags, the part-of-speech information, and the dependency information from the analysis unit 13, the determination unit 14 selects one of the chunks included in the original sentence as a target chunk (step S41). In step S41, the determination unit 14 selects chunks one by one in order from the beginning of the original sentence as target chunks. Although the following processing is repeatedly performed on all target chunks, one target chunk will be described here.

Subsequently, the determination unit 14 determines whether or not a verb is included in the target chunk (step S42). When it is determined that a verb is included in the target chunk (step S42; YES), the determination unit 14 sets the target chunk as a translation range (step S43). On the other hand, in step S42, when it is determined that no verb is included in the target chunk (step S42; NO), the determination unit 14 determines whether or not there is a chunk including a verb having a dependency relationship with a word included in the target chunk before the target chunk (step S44). In other words, the determination unit 14 determines whether or not any chunk preceding the target chunk (closer to the beginning of the sentence than the target chunk) includes a verb having a dependency relationship with a word included in the target chunk. In the present embodiment, the determination unit 14 determines whether or not there is a chunk including a verb that is a modifier of a word included in the target chunk before the target chunk.

When it is determined that there is a chunk including a verb that is a modifier of a word included in the target chunk before the target chunk (step S44; YES), the determination unit 14 sets a range from the chunk to the target chunk as a translation range (step S45).

Then, the determination unit 14 determines whether or not a subject is included in the translation range set in step S43 or step S45 (step S46). When it is determined that a subject is included in the translation range (step S46; YES), the determination unit 14 determines the translation range as a final translation range and ends the translation range determination process. On the other hand, in step S46, when it is determined that no subject is included in the translation range (step S46; NO), the determination unit 14 adds a chunk including the subject corresponding to the translation range to the translation range (step S47), and ends the translation range determination process. In step S47, the determination unit 14 determines, for example, a range from the chunk including a subject to the target chunk as a final translation range.

In step S44, when it is determined that there is no chunk including a verb which is a modifier of a word included in the target chunk before the target chunk (step S44; NO), the determination unit 14 determines the target chunk as a translation range (step S48) and ends the translation range determination process. Then, the determination unit 14 outputs (chunks included in) the translation range to the translation unit 15. When the translation range determination process for one target chunk is completed, the determination unit 14 repeats the translation range determination process shown in FIG. 7 until all the chunks included in the original sentence are selected as target chunks. That is, the determination unit 14 selects the next chunk as the target chunk (step S41), and sequentially performs the processes after step S42.

In the example shown in FIG. 9, since the chunk Ch1 includes the verb "met" and the subject "We", only the chunk Ch1 is determined as the translation range Si1 of the chunk Ch1 (see FIG. 10). Since the chunk Ch2 does not include any verb, the chunk Ch1 including the verb "met" that is a modifier of the word "Nagoya" included in the chunk Ch2 is specified. Since the chunk Ch1 includes the subject "We", the range from the chunk Ch1 to the chunk Ch2 is determined as the translation range Si2 of the chunk Ch2 (see FIG. 10).

Since the chunk Ch3 includes the verb "decide" and the subject "we", only the chunk Ch3 is determined as the translation range Si3 of the chunk Ch3 (see FIG. 10). Since the chunk Ch4 does not include any verb, the chunk Ch3 including the verb "decide" which is a modifier of the word "choose" included in the chunk Ch4 is specified. Since the chunk Ch3 includes the subject "we", the range from the chunk Ch3 to the chunk Ch4 is determined as the translation range Si4 of the chunk Ch4 (see FIG. 10). Since "to choose" included in the chunk Ch4 is regarded as a to-infinitive, it is not determined to be a verb.

Subsequently, the translation unit 15 translates the translation range (step S15). Upon receiving (chunks included in) the translation range from the determination unit 14, the translation unit 15 translates the translation range using, for example, the machine translation model 50, and outputs the translation result to the output unit 16. Specifically, the machine translation model 50 receives, as an input sentence X, a character string obtained by arranging chunks included in the translation range in order from the beginning of the original sentence, and outputs an output sentence Y as a translation result. In the example shown in FIG. 10, the English translation ranges Si1 to Si4 are sequentially translated into Japanese, and the Japanese translated sentences St1 to St4 are output.

Subsequently, the output unit 16 outputs the translation result (step S16). Upon receiving the translation result from the translation unit 15, the output unit 16 outputs the translation result to an output device such as a display and a speaker. The output unit 16 may output (transmit) the translation result to a device (external device) different from the translation device 10.

Thus, a series of processes of the translation method is completed. Note that step S13 may be performed before step S12 or may be performed in parallel with step S12. Step S46 and step S47 may also be performed on the translation range determined (set) in step S48. In step S45, the determination unit 14 sets a range from a chunk including a verb that is a modifier of a word included in a target chunk to the target chunk as a translation range. However, it is sufficient that at least the chunk including the verb and the target chunk are included in the translation range. Therefore, when there is another chunk between the chunk including the verb and the target chunk, the other chunk needs not to be included in the translation range. In step S47, when there is another chunk between the chunk including the subject and the chunk including the verb, the other chunk needs not to be included in the translation range.

In step S47, it is assumed that the chunk including the subject precedes the translation range. However, the determination unit 14 may determine whether or not the chunk including the subject precedes the translation range, and perform step S47 when the chunk including the subject precedes the translation range. In this case, when the chunk including the subject does not precede the translation range, the determination unit 14 may determine the translation range set in step S43 or step S45 as the final translation range. Step S46 and step S47 may be omitted.

In the translation device 10 described above, since the original sentence is translated in units of chunks, it is possible to shorten the time until the translation result is obtained as compared with the case where the entire original sentence is translated. When no verb is included in the target chunk, the target chunk and a chunk including a verb corresponding to a word included in the target chunk (a verb having a dependency relationship with the word) among chunks located closer to the beginning of the original sentence than the target chunk are added to the translation range, and the translation range is translated. According to this configuration, since a verb is included in the translation range, the meaning of each word in the original sentence can be made clearer, and the context can be made clearer. Therefore, it is possible to improve the translation accuracy while shortening the time until the translation result is obtained.

When a verb is included in the target chunk, the target chunk is added to the translation range. In a case where a verb is included in the target chunk, even if only the target chunk is translated, erroneous translation is unlikely to occur, and thus it is possible to maintain translation accuracy.

For example, in the case of translating a word in which a verb and a noun have the same form, such as "train", if there is no subject, it may not be clear whether the word is a verb or a noun. In addition, if there is no subject, the subject may be erroneously translated into a subject different from the original subject. However, in the translation device 10, when no subject is included in the translation range, a chunk including the subject corresponding to the translation range among chunks positioned closer to the beginning of the original sentence than the target chunk is further added to the translation range. According to this configuration, since the subject and the verb which are basic components of the sentence are included in the translation range, the context can be made clearer. Therefore, it becomes clear which part of speech a word in which a verb and a noun have the same form is. In addition, since the subject becomes clear, the possibility of being erroneously translated into a different subject is reduced. As a result, the translation accuracy can be further improved.

In the example shown in FIG. 10, since both the translation range Si1 and the translation range Si2 include the chunk Ch1, there are many overlapping portions between the translated sentence St1 and the translated sentence St2. Similarly, since both the translation range Si3 and the translation range Si4 include the chunk Ch3, there are many overlapping portions between the translated sentence St3 and the translated sentence St4. Therefore, when the translated sentences St1 to St4 are sequentially output, the user may feel unnaturalness.

In order to solve such a problem, when the translation range includes a chunk different from the target chunk, the translation unit 15 may specify a redundant word from among words included in the translation range and translate the translation range so as not to include a translation result of the redundant word. The redundant word is a word that is not included in the translation result of the translation range. Hereinafter, processing of the translation unit 15 according to the modification will be described in detail. In this modification, the determination unit 14 outputs the part-of-speech information to the translation unit 15 in addition to the translation range.

First, when the translation range includes a chunk different from the target chunk, the translation unit 15 specifies a redundant word from among words located closer to the beginning of the original sentence than the target chunk. Since the chunk different from the target chunk is closer to the beginning of the original sentence than the target chunk, the chunk has already been translated as the target chunk.

Figure 11:
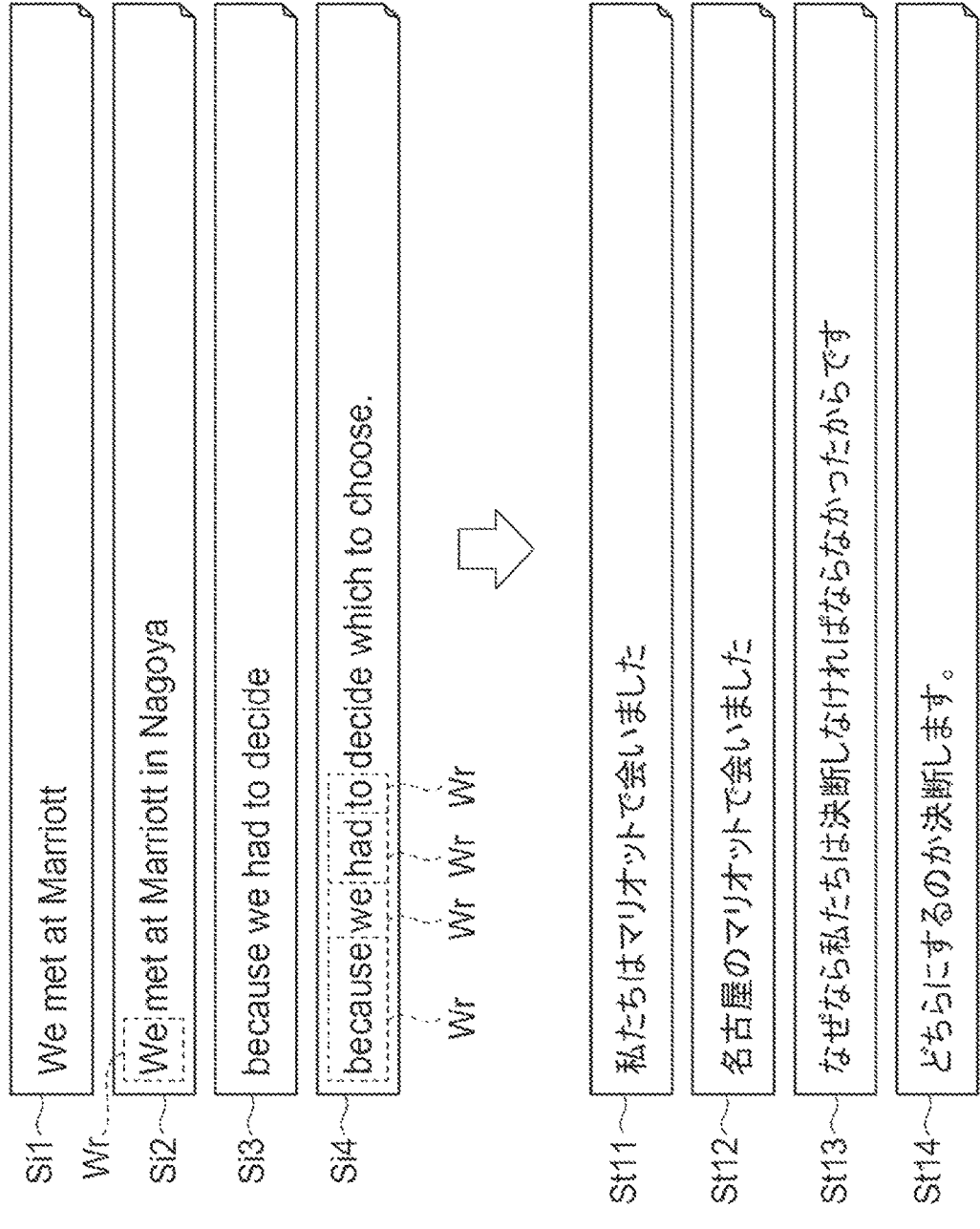
FIG. 11 is a diagram showing another example of a translation result.

An example of a method for specifying a redundant word will be described. For example, the translation unit 15 specifies, as a redundant word, a word closer to the beginning of the original sentence than a verb from among words located closer to the beginning of the original sentence than the target chunk. For example, as shown in FIG. 11, the translation range Si2 includes the chunk Ch1 ("We met at Marriott") different from the chunk Ch2 ("in Nagoya") which is the target chunk. Therefore, the translation unit 15 specifies the word "We" closer to the beginning of the sentence than the verb "met" included in the translation range Si2 as the redundant word Wr. Similarly, the translation range Si4 includes the chunk Ch3 ("because we had to decide") different from the chunk Ch4 ("which to choose") that is the target chunk. Therefore, the translation unit 15 specifies, as the redundant words Wr, words "because", "we", "had", and "to" that are closer to the beginning of the sentence than the verb "decide" included in the translation range Si4.

Subsequently, the translation unit 15 resets the attention value $a_i$ assigned to the redundant word to 0. Specifically, the translation unit 15 records the sequence number of the redundant word in the translation range as the translation unnecessary position. The sequence number of the redundant word in the translation range is a number counted from the word at the beginning of the translation range. Then, in the calculation of the context vector $c_j$ shown in Equation (2), when the number i is the translation unnecessary position, the calculation is performed by setting the attention value $a_i$ to 0. By this calculation, the hidden state vector $he_i$ corresponding to the redundant word is not reflected in the context vector $c_j$. On the other hand, since the hidden state vector $he_s$ is generated from all the words of the original sentence including the redundant word, the decoder 70 generates a translated sentence in consideration of the context.

In the example shown in FIG. 11, the English translation ranges Si1 to Si4 are sequentially translated into Japanese, as in the example shown in FIG. 10. Since the translation range Si1 does not include any redundant word Wr, the translated sentence St11 of the translation range Si1 is identical to the translated sentence St1. Since the translation range Si3 does not include any redundant word Wr, the translated sentence Stl3 of the translation range Si3 is identical to the translated sentence St3. On the other hand, since the translation range Si2 includes the redundant word Wr, the translated sentence St12 of the translation range Si2 does not include the translation result of the redundant word Wr. Similarly, since the translation range Si4 includes the redundant words Wr, the translated sentence St14 of the translation range Si4 does not include the translation results of the redundant words Wr. Therefore, the overlapping portion between the translated sentence St11 and the translated sentence St12 is smaller than the overlapping portion between the translated sentence St1 and the translated sentence St2. The overlapping portion between the translated sentence St13 and the translated sentence St14 is smaller than the overlapping portion between the translated sentence St3 and the translated sentence St4.

In the above-described modification, when the translation range includes a chunk different from the target chunk, the translation unit 15 specifies a redundant word from among words included in the translation range and translates the translation range so as not to include the translation result of the redundant word. According to this configuration, the translation result of the redundant word is excluded while performing the translation in consideration of the context. As a result, it is possible to reduce the overlapping portion with the already translated chunk while improving the translation accuracy.

The verb may be preceded by a subject or the like. However, if a subject or the like that has already been translated is translated again, it may become redundant. On the other hand, if translation of a verb is omitted, the meaning of the translation result may be ambiguous. In the above-described modification, the translation unit 15 specifies a word closer to the beginning of the original sentence than the verb among words included in the translation range as a redundant word. Therefore, it is possible to reduce the redundancy of the translation result while reducing the possibility that the meaning of the translation result becomes ambiguous.

In the above-described modification, the translation unit 15 resets the attention value $a_i$ assigned to the redundant word to 0. According to this configuration, all words included in the translation range are sequentially input to the encoder 60, and the hidden state vectors $he_i$ are generated. Therefore, since all words included in the translation range are considered, the translation range is translated in consideration of the context. On the other hand, when the attention value $a_i$ assigned to the redundant word is reset to 0, the translation result of the redundant word is not included in the translation result of the translation range. Therefore, it is possible to reduce the overlapping portion with the already translated chunk while improving the translation accuracy.

In the above-described modification, the sum of the attention values $a_i$ assigned to the target words is a value obtained by subtracting the sum of the attention values $a_i$ assigned to the redundant words from 1. The target word is a word other than the redundant words among the words included in the translation range. Therefore, when the sum of the attention values $a_i$ assigned to the redundant words is small, even if the attention value $a_i$ assigned to the redundant word is reset to 0, the context vector $c_j$ is not greatly deteriorated. That is, since the hidden state vector $he_i$ is reflected in the context vector $c_j$, the translation accuracy is maintained. On the other hand, in a case where the sum of the attention values $a_i$ assigned to the redundant words is large, if the attention value $a_i$ assigned to the redundant word is reset to 0, there is a possibility that the context vector $c_j$ is greatly deteriorated. That is, since the value of the context vector $c_j$ becomes small and the hidden state vector $he_i$ is not sufficiently reflected in the context vector $c_j$, there is a possibility that the translation accuracy is reduced.

For this problem, the translation unit 15 may adjust the attention values $a_i$ of the target words so that the sum of the attention values $a_i$ of the target words among the words included in the translation range becomes 1. According to this configuration, even if the attention value $a_i$ assigned to the redundant word is reset to 0, the sum of the attention values $a_i$ of the remaining target words becomes 1. Accordingly, since the hidden state vector $he_i$ is reflected in the context vector $c_j$, it is possible to suppress a decrease in translation accuracy.

The translation unit 15 adjusts the attention values $a_i$ of the target words by, for example, equally distributing the attention value $a_i$ assigned to the redundant word to the attention values $a_i$ of the target words. For example, in the example of FIG. 11, when the sum of the attention values $a_i$ assigned to the four redundant words Wr included in the translation range Si4 is 0.2, the attention values $a_i$ of these redundant words Wr are reset to 0, and 0.05 is added to the attention values $a_i$ of the remaining four words (target words). According to this configuration, it is possible to set the sum of the attention values $a_i$ of the target words to 1 while maintaining the magnitude relationship between the attention values $a_i$ of the target words. Therefore, since the magnitude relationship between the hidden state vectors $he_i$ reflected in the context vector $c_j$ is maintained, it is possible to suppress a decrease in translation accuracy.

The translation unit 15 may adjust the attention values $a_i$ of the target words by distributing the attention value $a_i$ assigned to the redundant word in proportion to the ratio between the attention values $a_i$ of the target words. In the example of FIG. 11, it is assumed that the sum of the attention values $a_i$ assigned to the four redundant words Wr included in the translation range Si4 is 0.2, and the attention values $a_i$ of the four target words "decide", "which", "to", and "choose" are 0.1, 0.1, 0.1, and 0.5, respectively. In this case, 0.025 ($=0.2{\times}0.1/(0.1+0.1+0.1+0.5)$) is added to the attention value $a_i$ of each of the target words "decide", "which", and "to". To the attention value $a_i$ of the target word "choose", 0.125 ($=0.2{\times}0.5/(0.1+0.1+0.1+0.5)$) is added. According to this configuration, it is possible to set the sum of the attention values $a_i$ of the target words to 1 while maintaining the ratio between the attention values $a_i$ of the target words. Accordingly, since the ratio (influence degree) of the hidden state vectors $he_i$ reflected in the context vector $c_j$ is maintained, it is possible to suppress a decrease in translation accuracy.

Another example of a method of specifying a redundant word will be described. The translation unit 15 specifies each of two or more consecutive proper nouns that are located closer to the beginning of the original sentence than the target chunk and have the same named entity class as the redundant word Wr. In this case, the translation unit 15 specifies all words in the chunk including the specified redundant word Wr as redundant words Wr. Further, the translation unit 15 specifies, as the redundant word Wr, a word in a chunk that does not include any of the subject, the verb, and the proper noun among chunks closer to the beginning of the original sentence than the target chunk.

Figure 12:
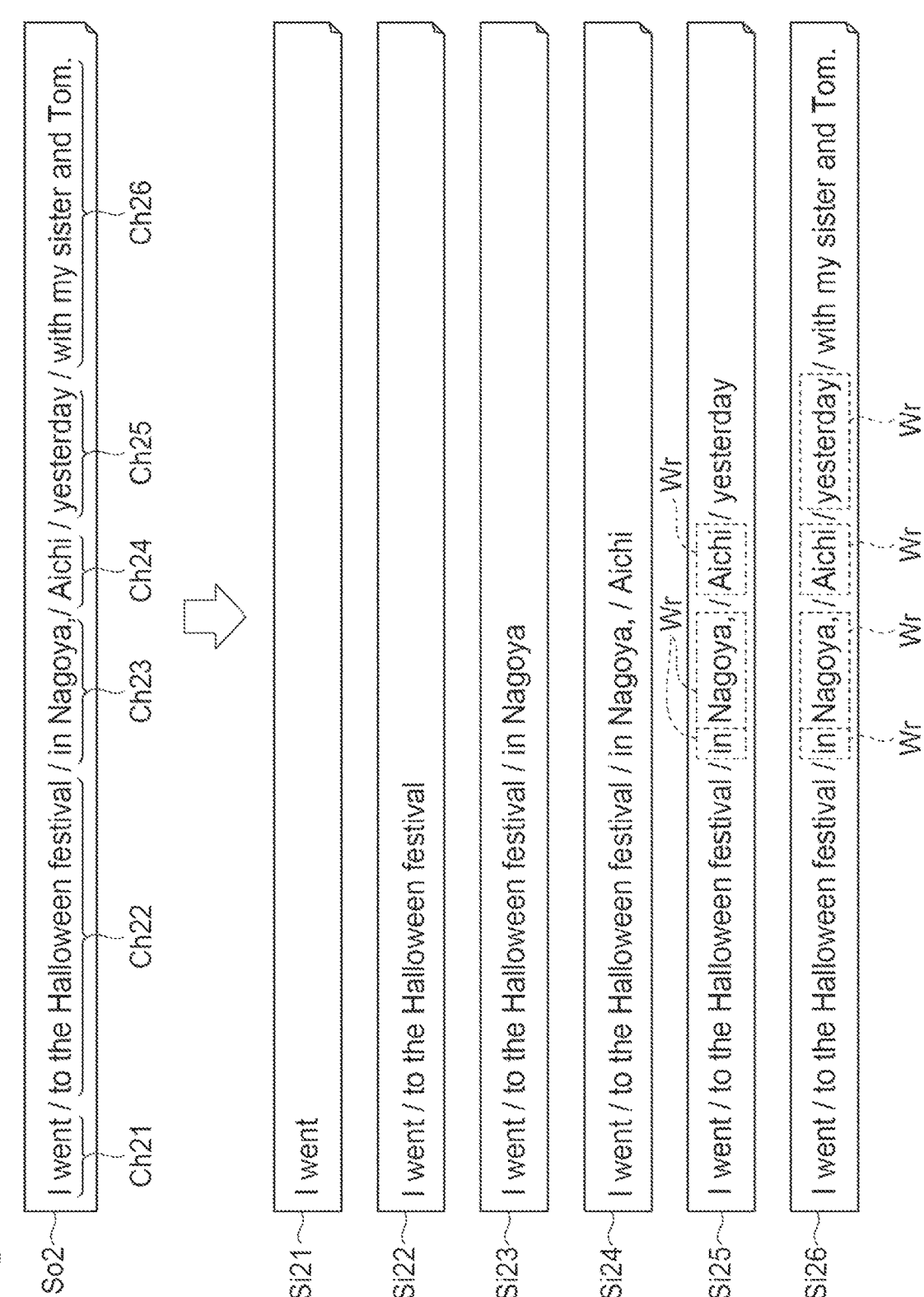
FIG. 12 is a diagram for explaining a method of specifying a redundant word.

In the example shown in FIG. 12, the original sentence So2 is divided into chunks Ch21 to Ch26. The translation ranges Si21 to Si26 are translation ranges of the chunks Ch21 to Ch26 determined by the translation range determination process shown in FIG. 7, respectively. The translation range Si25 includes chunks Ch21 to 24 different from the chunk Ch25 that is the target chunk. The consecutive words "Nagoya" and "Aichi" located closer to the beginning of the original sentence So2 than the chunk Ch25 are both in the "location" class. Therefore, the translation unit 15 specifies each word included in the chunk Ch23 including the word "Nagoya" as a redundant word Wr, and specifies each word included in the chunk Ch24 including the word "Aichi" as a redundant word Wr.

The translation range Si26 includes chunks Ch21 to 25 different from the chunk Ch26 that is the target chunk. The chunk Ch25 closer to the beginning of the original sentence So2 than the chunk Ch26 does not include any of the subject, verb, and proper noun. Therefore, the translation unit 15 specifies each word included in the chunk Ch25 as a redundant word Wr. As with the translation range Si25, the translation unit 15 specifies each word included in the chunks Ch23 and Ch24 as a redundant word Wr.

The above methods may be used in combination. The translation unit 15 may specify, as redundant words, words other than the words included in the target chunk and the verb among the words included in the translation range. Instead of the configuration in which the translation unit 15 specifies, as the redundant words Wr, words in a chunk that does not include any of the subject, the verb, and the proper noun among chunks closer to the beginning of the original sentence than the target chunk, the determination unit 14 may not add a chunk that does not include any of the subject, the verb, and the proper noun among chunks closer to the beginning of the original sentence than the target chunk to the translation range.

Although embodiments of the present disclosure have been described above, the present disclosure is not limited to the above-described embodiments.

The translation device 10 may be configured by a single device coupled physically or logically, or may be configured by two or more devices that are physically or logically separated from each other. For example, the translation device 10 may be implemented by a plurality of computers distributed over a network such as cloud computing. As described above, the configuration of the translation device 10 may include any configuration that can realize the functions of the translation device 10.

The translation device 10 does not have to include the division unit 12. In this case, the acquisition unit 11 further acquires information indicating a division point of the original sentence and part-of-speech information from the outside of the translation device 10. The translation device 10 does not have to include the analysis unit 13. In this case, the acquisition unit 11 further acquires dependency information from the outside of the translation device 10.

When the subject is a proper noun, the division unit 12 does not have to divide the original sentence immediately after the proper noun.

When the analysis unit 13 fails in the dependency analysis, the determination unit 14 may set the target chunk as the translation range.

The encoder 60 may include another recursive computation layer instead of the LSTM layer 62. The decoder 70 may include another recursive computation layer instead of the LSTM layer 72. Examples of other recursive computation layers include simple RNNs and gated recurrent units (GRUs).

Note that the block diagrams used in the description of the above embodiments show blocks of functional units. These functional blocks (components) are realized by any combination of at least one of hardware and software. The method for realizing each functional block is not particularly limited. That is, each functional block may be realized using a single device coupled physically or logically. Alternatively, each functional block may be realized using two or more physically or logically separated devices that are directly or indirectly (e.g., by using wired, wireless, etc.) connected to each other. The functional blocks may be realized by combining the one device or the plurality of devices mentioned above with software.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating, mapping, assigning, and the like. However, the functions are not limited thereto. For example, a functional block (component) for performing transmission is referred to as a transmitting unit or a transmitter. As explained above, the method for realizing any of the above is not particularly limited.

Figure 13:
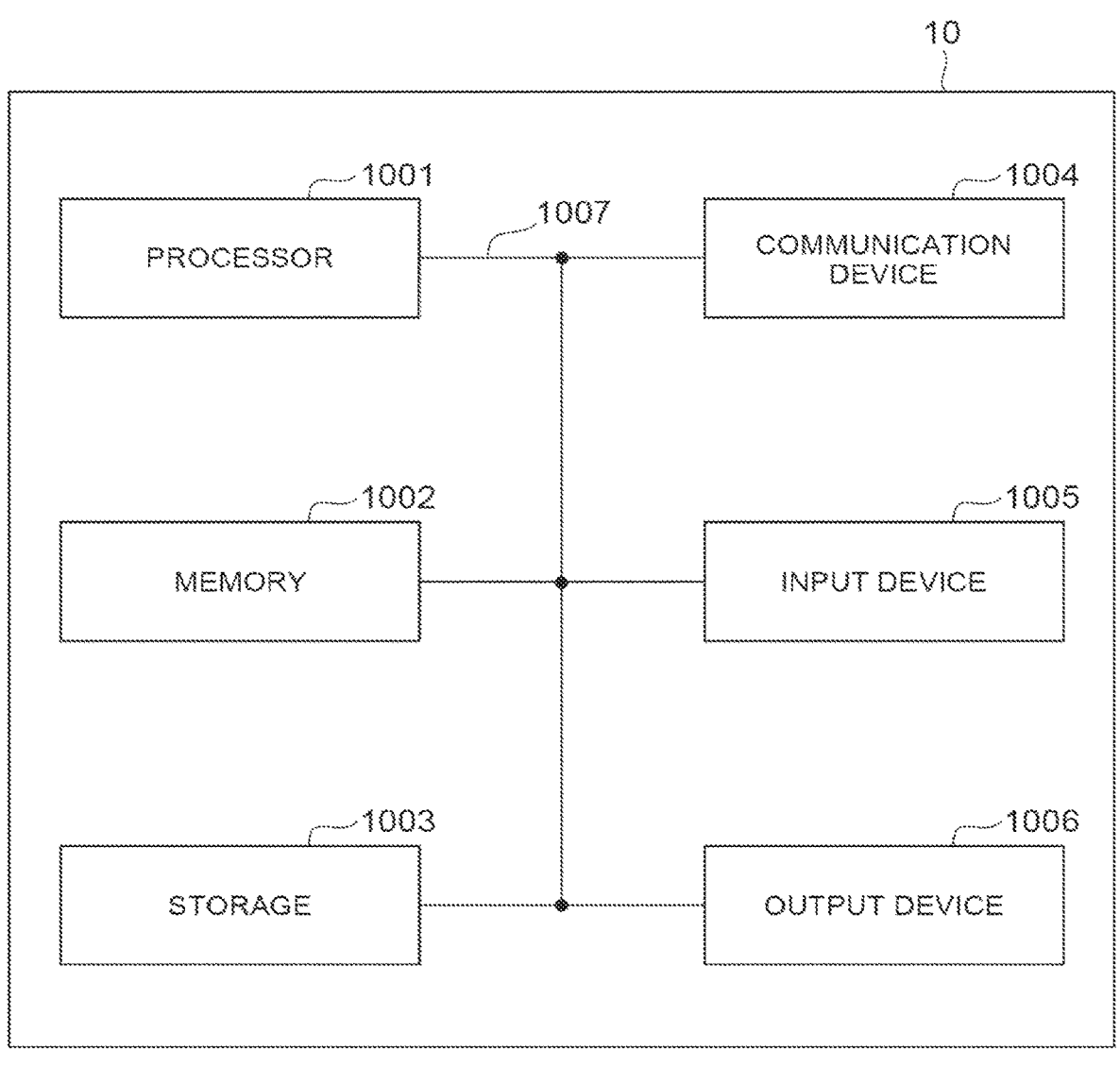
FIG. 13 is a diagram showing a hardware configuration of the translation device shown in FIG. 1.

For example, the translation device 10 according to one embodiment of the present disclosure may function as a computer performing the processes of the present disclosure. The hardware configuration of the translation device 10 will be described below. FIG. 13 is a diagram showing an example of the hardware configuration of the translation device 10 according to one embodiment of the present disclosure. The above-described translation device 10 may be physically configured as a computer device including a processor 1001, a memory 1002, a storage 1003, a communication device 1004, an input device 1005, an output device 1006, a bus 1007, and the like.

In the following description, the term "device" can be read as a circuit, a device, a unit, etc. The hardware configuration of the translation device 10 may be configured to include one or more of each device shown in the figure, or may be configured not to include some of the devices.

Each function of the translation device 10 is realized by causing the processor 1001, by loading predetermined software (program) onto hardware such as the processor 1001 and the memory 1002, to perform computation to control the communication via the communication device 1004 and to control at least one of reading data from and writing data to the memory 1002 and the storage 1003.

The processor 1001 operates, for example, an operating system to control the entire computer. The processor 1001 may be configured by a central processing unit (CPU) including an interface with a peripheral device, a controller, an arithmetic unit, a register, and the like. For example, each function of the above-described translation device 10 may be realized by the processor 1001.

The processor 1001 reads a program (program code), a software module, data, and the like from at least one of the storage 1003 and the communication device 1004 into the memory 1002, and executes various processes in accordance with these. As the program, a program for causing a computer to execute at least a part of the operations described in the above-described embodiments is used. For example, each function of the translation device 10 may be realized by a control program stored in the memory 1002 and operating in the processor 1001. Although it has been described that the various processes described above are executed by a single processor 1001, the various processes may be executed simultaneously or sequentially by two or more processors 1001. The processor 1001 may be implemented by one or more chips. The program may be transmitted from a network via a telecommunication line.

The memory 1002 is a computer-readable recording medium, and, for example, may be configured by at least one of a read only memory (ROM), an erasable programmable ROM (EPROM), an electrically erasable programmable ROM (EEPROM), a random access memory (RAM) and the like. The memory 1002 may be referred to as a register, a cache, a main memory (main storage) or the like. The memory 1002 can store executable programs (program codes), software modules, and the like for performing the translation method according to one embodiment of the present disclosure.

The storage 1003 is a computer-readable recording medium, and, for example, may be configured by at least one of an optical disc such as a compact disc ROM (CD-ROM), a hard disk drive, a flexible disk, a magneto-optical disc (e.g., a compact disc, a digital versatile disc, a Blu-ray (Registered Trademark) disc), a smart card, a flash memory (e.g., a card, a stick, a key drive), a floppy (Registered Trademark) disk, a magnetic strip, and the like. The storage 1003 may be referred to as an auxiliary storage. The recording medium described above may be, for example, a database, a server, or any other suitable medium that includes at least one of the memory 1002 and the storage 1003.

The communication device 1004 is hardware (transmission/reception device) for performing communication between computers through at least one of a wired network and a wireless network, and is also referred to as a network device, a network controller, a network card, a communication module, or the like. The communication device 1004 may include, for example, a high-frequency switch, a duplexer, a filter, a frequency synthesizer, and the like to realize at least one of frequency division duplex (FDD) and time division duplex (TDD). For example, the acquisition unit 11, the output unit 16, and the like described above may be realized by the communication device 1004.

The input device 1005 is an input device (e.g., a keyboard, a mouse, a microphone, a switch, a button, a sensor, or the like) that accepts input from the outside. The output device 1006 is an output device (e.g., a display, a speaker, an LED lamp, etc.) that performs an output to the outside. The input device 1005 and the output device 1006 may be integrated as a touch panel, for example.

Devices such as the processor 1001 and the memory 1002 are connected to each other with the bus 1007 for communicating information. The bus 1007 may be configured using a single bus or using a separate bus for every two devices.

The translation device 10 may include hardware such as a microprocessor, a digital signal processor (DSP), an application specific integrated circuit (ASIC), a programmable logic device (PLD), and a field programmable gate array (FPGA). Some or all of each functional block may be realized by the hardware. For example, the processor 1001 may be implemented using at least one of such hardware components.

Notification of information is not limited to the aspects/embodiments described in the present disclosure, and may be performed using other methods.

In the processing procedures, sequences, flowcharts, and the like of each of the aspects/embodiments described in the present disclosure, the order of processing may be interchanged, as long as there is no inconsistency. For example, the methods described in the present disclosure present the various steps using exemplary order and are not limited to the particular order presented.

Information and the like may be output from an upper layer to a lower layer or may be output from a lower layer to an upper layer. Information and the like may be input and output via a plurality of network nodes.

The input/output information and the like may be stored in a specific location (e.g., a memory) or may be managed using a management table. The information to be input/output and the like can be overwritten, updated, or added. The output information and the like may be deleted. The input information and the like may be transmitted to another device.

The determination may be performed by a value (0 or 1) represented by one bit, a truth value (Boolean: true or false), or a comparison of a numerical value (for example, a comparison with a predetermined value).

The aspects/embodiments described in the present disclosure may be used separately, in combination, or switched with the execution of each aspect/embodiment. The notification of the predetermined information (for example, notification of "being X") is not limited to being performed explicitly, and may be performed implicitly (for example, without notifying the predetermined information).

Although the present disclosure has been described in detail above, it is apparent to those skilled in the art that the present disclosure is not limited to the embodiments described in the present disclosure. The present disclosure may be implemented as modifications and variations without departing from the spirit and scope of the present disclosure as defined by the claims. Accordingly, the description of the present disclosure is for the purpose of illustration and has no restrictive meaning relative to the present disclosure.

Software, whether referred to as software, firmware, middleware, microcode, hardware description language, or other names, should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, etc.

Software, an instruction, information, and the like may be transmitted and received via a transmission medium. For example, if software is transmitted from a website, a server, or any other remote source using at least one of wired technologies (such as a coaxial cable, an optical fiber cable, a twisted pair, and a digital subscriber line (DSL)) and wireless technologies (such as infrared light and microwaves), at least one of these wired and wireless technologies is included within the definition of a transmission medium.

The information, signals, and the like described in the present disclosure may be represented using any of a variety of different technologies. For example, data, instructions, commands, information, signals, bits, symbols, chips, etc., which may be referred to throughout the above description, may be represented by voltages, electric currents, electromagnetic waves, magnetic fields or particles, optical fields or photons, or any combination thereof.

It should be noted that terms described in the present disclosure and terms necessary for understanding the present disclosure may be replaced with terms having the same or similar meanings.

The terms "system" and "network" as used in the present disclosure are used interchangeably.

The information, parameters, and the like described in the present disclosure may be expressed using absolute values, relative values from a predetermined value, or other corresponding information.

The names used for the parameters described above are in no way restrictive. Further, the mathematical expressions and the like using these parameters may be different from those explicitly disclosed in the present disclosure.

The term "determining" as used in the present disclosure may encompass a wide variety of operations. For example, the term "determining" may be regarded as judging, calculating, computing, processing, deriving, investigating, looking up, search, inquiry (e.g., searching in a table, a database, or another data structure), and ascertaining. Also, the term "determining" may be regarded as receiving (e.g., receiving information), transmitting (e.g., transmitting information), inputting, outputting, and accessing (e.g., accessing data in a memory). Also, the term "determining" may be regarded as resolving, selecting, choosing, establishing, comparing, and the like. That is, the term "determining" may be regarded as a certain type of action related to "determining". The term "determining" may be read as "assuming", "expecting", "considering", etc. The term "connected", "coupled", or any variation thereof means any direct or indirect connection or coupling between two or more elements. One or more intermediate elements may be present between two elements that are "connected" or "coupled" to each other. The coupling or connection between the elements may be physical, logical, or a combination thereof. For example, "connection" may be read as "access". When "connect" or "coupling" is used in the present disclosure, the two elements may be considered to be "connected" or "coupled" to each other using one or more electrical wires, cables, printed electrical connections, and the two elements may be considered to be "connected" or "coupled" to each other using, as some non-limiting and non-exhaustive examples, electromagnetic energy having wavelengths in the radio frequency region, the microwave region, and light (both visible and invisible) regions.

The term "based on" as used in the present disclosure does not mean "based only on" unless otherwise specified. In other words, the term "based on" means both "based only on" and "based at least on".

Any reference to an element using the designations "first", "second", etc., as used in the present disclosure does not generally limit the amount or order of the element. Such designations may be used in the present disclosure as a convenient way to distinguish between two or more elements. Thus, references to the first and second elements do not imply that only two elements may be adopted, or that the first element must precede the second element in any way.

The "unit" in the configuration of each of the above devices may be replaced with "circuit", "device", etc.

When "include", "including", and variations thereof are used in the present disclosure, these terms are intended to be inclusive, as well as the term "comprising". Furthermore, the term "or" as used in the present disclosure is intended not to be an exclusive OR.

In the present disclosure, where article such as "a", "an" and "the" in English is added by translation, the present disclosure may include that the noun following the article is plural.

In the present disclosure, the term "A and B are different" may mean that "A and B are different from each other". The term may mean that "each of A and B is different from C". Terms such as "separated" and "combined" may also be interpreted in a similar manner to "different".

REFERENCE SIGNS LIST

10 . . . translation device, 11 . . . acquisition unit, 12 . . . division unit, 13 . . . analysis unit, 14 . . . determination unit, 15 . . . translation unit, 16 . . . output unit, 50 . . . machine translation model.

The invention claimed is:

1. A translation device that translates an original sentence in units of chunks which are processing units, the translation device comprising:

processing circuitry configured to receive an utterance of a user and perform speech recognition on the utterance to obtain the original sentence that is to be translated in the units of chunks;

determine a translation range for translating a first chunk to be translated;

translate the translation range in real-time; and output a translation result to an output device that is one of a display or speaker, wherein the processing circuitry adds, to the translation range, the first chunk and a second chunk that includes a verb corresponding to a word included in the first chunk and that is closer to a beginning of the original sentence than the first chunk when no verb is included in the first chunk, wherein when the translation range includes a chunk different from the first chunk, the processing circuitry specifies a redundant word that is not included in the translation result from among words included in the translation range, and translates the translation range so as not to include a translation result of the redundant word, wherein the processing circuitry includes an encoder-decoder translation model with an attention mechanism, and wherein the processing circuitry resets an attention value assigned to the redundant word to 0.

2. The translation device according to claim 1, wherein when a verb is included in the first chunk, the processing circuitry adds the first chunk to the translation range.

3. The translation device according to claim 2, wherein when no subject is included in the translation range, the processing circuitry further adds, to the translation range, a third chunk that includes a subject corresponding to the translation range and that is closer to the beginning original sentence than the first chunk.

4. The translation device according to claim 1, wherein when no subject is included in the translation range, the processing circuitry further adds, to the translation range, a third chunk that includes a subject corresponding to the translation range and that is closer to the beginning of the original sentence than the first chunk.

5. The translation device according to claim 1, wherein the processing circuitry specifies, as the redundant word, a word closer to the beginning of the original sentence than the verb from among words included in the translation range.

6. The translation device according to claim 1, wherein the processing circuitry adjusts attention values so that a sum of the attention values of target words that are words other than the redundant word among words included in the translation range becomes 1.

7. The translation device according to claim 6, wherein the processing circuitry equally distributes the attention value assigned to the redundant word to the attention values of the target words.

8. The translation device according to claim 6, wherein the processing circuitry distributes the attention value assigned to the redundant word in proportion to a ratio of the attention values of the target words.

9. A method, implemented by processing circuitry of a translation device that translates an original sentence in units of chunks which are processing units, the method comprising:

receiving an utterance of a user and performing speech recognition on the utterance to obtain the original sentence that is to be translated in the units of chunks;

determining a translation range for translating a first chunk to be translated;

translating the translation range in real-time; and outputting a translation result to an output device that is one of a display or speaker, wherein the method includes adding, to the translation range, the first chunk and a second chunk that includes a verb corresponding to a word included in the first chunk and that is closer to a beginning of the original sentence than the first chunk when no verb is included in the first chunk, wherein in response to the translation range including a chunk different from the first chunk, the method includes specifying a redundant word that is not included in the translation result from among words included in the translation range, and translating the translation range so as not to include a translation result of the redundant word, wherein the processing circuitry includes an encoder-decoder translation model with an attention mechanism, and wherein the method includes resetting an attention value assigned to the redundant word to 0.

\* \* \* \* \*